US011883916B1

(12) United States Patent
Korthals

(10) Patent No.: US 11,883,916 B1
(45) Date of Patent: Jan. 30, 2024

(54) MODULAR WORKPIECE HOLDING SYSTEM AND METHOD

(71) Applicant: HDM Hydraulics, LLC, Tonawanda, NY (US)

(72) Inventor: Nathan Korthals, Tonawanda, NY (US)

(73) Assignee: HDM Hydraulics, LLC, Tonawanda, NY (US)

(*) Notice: Subject to any disclaimer, the term of this patent is extended or adjusted under 35 U.S.C. 154(b) by 0 days.

(21) Appl. No.: 18/067,102

(22) Filed: Dec. 16, 2022

(51) Int. Cl.
*B23Q 1/26* (2006.01)

(52) U.S. Cl.
CPC ...................... *B23Q 1/26* (2013.01)

(58) Field of Classification Search
CPC ....................................................... B23Q 1/26
See application file for complete search history.

(56) References Cited

U.S. PATENT DOCUMENTS

| | | | |
|---|---|---|---|
| 5,961,261 A | 10/1999 | Stark | |
| 6,170,836 B1 | 1/2001 | Etter | |
| 6,250,619 B1 * | 6/2001 | Cook | B25B 11/005 269/329 |
| 7,464,853 B2 | 12/2008 | Buchheit et al. | |

FOREIGN PATENT DOCUMENTS

| | | |
|---|---|---|
| CN | 107717501 | 2/2018 |
| CN | 209664890 | 2/2019 |
| CN | 209349869 | 9/2019 |
| CN | 211029092 | 7/2020 |
| DE | 1097786 | 1/1961 |
| DE | 3531507 | 3/1987 |
| DE | 10117485 | 10/2002 |
| DE | 102017113751 | 12/2018 |

(Continued)

OTHER PUBLICATIONS

Machine Translation of CN209664890U "Multi-workpiece tension-compression clamping fixture" by Yang Jinling et al. (Year: 2019).*

(Continued)

*Primary Examiner* — Nirvana Deonauth
(74) *Attorney, Agent, or Firm* — Simpson & Simpson, PLLC

(57) ABSTRACT

A modular workpiece holding system having a top portion of a baseplate member having at least one opposingly facing fixed wedge assembly and dynamic wedge assembly. The dynamic wedge assembly is operationally coupled to at least one spring and piston assembly adapted to draw the dynamic wedge assembly axially towards the baseplate member wherein the dynamic wedge assembly, when the workpiece holding system is in a resting state, imparts a transverse force onto a workpiece member, pressing the workpiece member against the fixed wedge assembly, securing the workpiece to the workpiece holding system. The spring member is releasable when one or more of a gas and hydraulic fluid used to push the dynamic wedge assembly outward is discharged from the spring and piston assembly cavity within the fixture base, whereupon the spring member is adapted to re-impart the traverse force of the resting state of the dynamic wedge assembly.

18 Claims, 10 Drawing Sheets

(56) References Cited

FOREIGN PATENT DOCUMENTS

| EP | 1702712 | | 9/2006 | | |
|----|---------|---|--------|---|---|
| GB | 1309088 | | 3/1973 | | |
| GB | 2327898 A | * | 2/1999 | ............... | B25B 5/08 |

OTHER PUBLICATIONS https://www.positrol.com/fixture-clamping/?_vsrefdom=ppcgoogle&utm_source=google&utm_medium=cpc&utm_term=%2Bhydraulic%20%2Bfixturing&utm_campaign=Positrol&gclid=Cj0KCQjwmPSSBhCNARIsAH3cYgbSsMaAmk3d30W5Vmm5ypzjblcUksTjZYqTY1A6nIEByoiBS4TXU8saAmu3EALw_wcB, last accessed Mar. 7, 2023.
https://dmtworkholding.com/, last accessed Mar. 7, 2023.
https://www.kurtworkholding.com/custom-solutions/?gclid=Cj0KCQjwmPSSBhCNARIsAH3cYgbczYOTYMEe9hXI8Y1JxMlmtap9NOgNcuHabj2YMgseRRt7p-_2kCUaAtncEALw_wcB, last accessed Mar. 7, 2023.
https://pawsworkholding.com/custom-workholding/, last accessed Mar. 7, 2023.

* cited by examiner

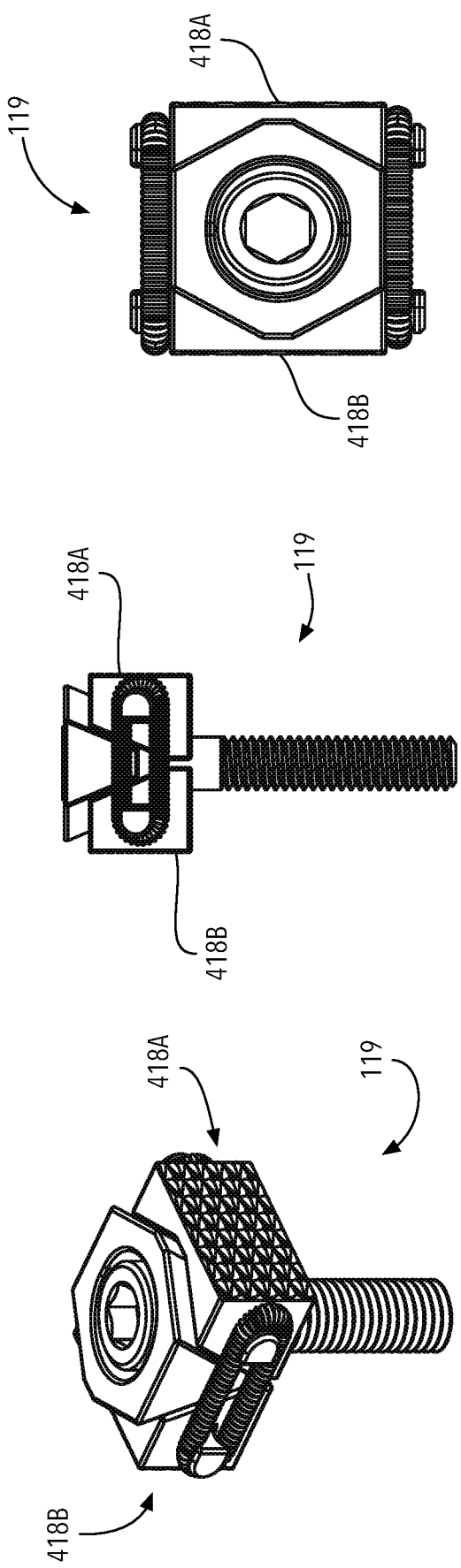
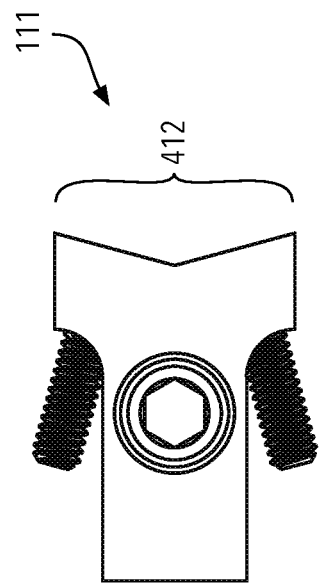
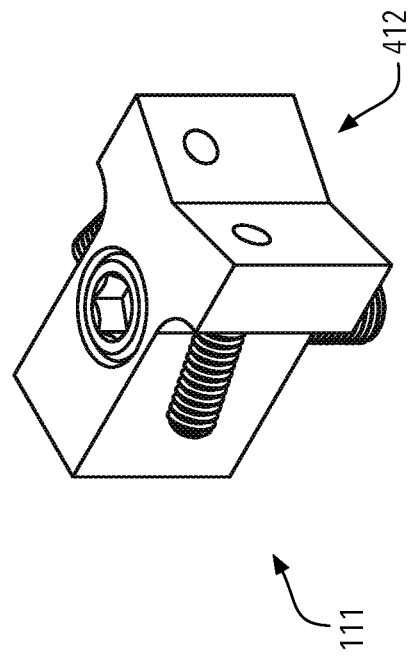
FIG. 7A  FIG. 7B  FIG. 7C  FIG. 7D  FIG. 7E

MODULAR WORKPIECE HOLDING SYSTEM AND METHOD

FIELD

The present disclosure relates to a modular workpiece holding system and method.

BACKGROUND

Workspace holding systems can be inconvenient and at times even dangerous to use. They must be actively engaged to hold workpieces so that users or machines can work on those workpieces. Workpieces must be held securely for given operations, and active elements must remain engaged during those operations. Inconvenience may further come from a need to engage each workpiece with the holding system separately. The need to have active elements of a system securing workpieces when operating on those workpieces creates potential operational failure points that could unintentionally release workpieces. Therefore, there is a need in the market for an improved workpiece holding system that minimizes risk and inconvenience of securing workpieces.

SUMMARY

Disclosed is a modular workpiece holding system that has a top portion of a baseplate member disposed on a fixture base and arranged to have a least one wedge pair, each wedge pair having an oppposingly facing fixed wedge assembly and dynamic wedge assembly. Each dynamic wedge assembly is operationally coupled to at least one spring and piston assembly, at least one spring member of the spring and piston assembly designed to draw the associated dynamic wedge assembly axially towards the baseplate member wherein the dynamic wedge assembly, when the workpiece holding system is in a resting state, imparts a transverse force onto a workpiece member, pressing the workpiece member against the fixed wedge assembly, securing the workpiece to the workpiece holding system.

The spring member contained within the spring and piston assembly is disposed within a spring and piston assembly cavity in the fixture base on which the baseplate is coupled. The spring and piston assembly is designed to release the dynamic wedge assembly and the workpiece member when the workpiece holding system is in an active state. The active state is rendered by at least one or more of a gas and hydraulic fluid delivered by way of at least one port within the fixture base, the at least one or more of a gas and hydraulic fluid designed to fill the spring and piston assembly cavity at least partly, pushing, therefore, by way of a piston member of the spring and piston assembly, the dynamic wedge assembly axially outward from the baseplate. The at least one or more of a gas and hydraulic fluid, when discharged from the spring and piston assembly cavity by way of the at least one port within the fixture base, is designed to reduce outward axial force imparted on the dynamic wedge assembly, whereupon the spring member is designed to reimport inward axial force and, therefore, the traverse force of the resting state of the dynamic wedge assembly onto at least one or more of the same and a different workpiece.

In some embodiments of the modular workpiece holding system, at least one wedge pair is disposed within at least one wedge pair row. In some embodiments of the modular workpiece holding system, each wedge pair of each row opens simultaneously with each other wedge pair in that wedge pair row.

In some embodiments of the modular workpiece holding system, the shape of the dynamic wedge assembly is adjustable. In some embodiments of the modular workpiece holding system, the shape of the dynamic wedge assembly is adjusted by exchanging at least one or more of the dynamic wedge assembly.

In some embodiments of the modular workpiece holding system, the release of the at least one or more of a gas and hydraulic fluid is partial, thereby reducing the total possible axial force and the transverse force of the spring member imparted on the workpiece relative to the resting state. In some embodiments of the modular workpiece holding system, the wedge members are substantially at least one or more of iron and steel. In some embodiments of the modular workpiece holding system, at least the opposing surfaces of the at least one or more of the dynamic wedge assembly and the fixed wedge assembly are substantially a polymer. In some embodiments of the modular workpiece holding system, at least a portion of the baseplate member is interchangeable.

The inventive concept will now be described more fully hereinafter with reference to the accompanying drawings, which are intended to be read in conjunction with this summary, the detailed description, and any preferred and/or particular embodiments specifically discussed or otherwise disclosed. Inventive concepts may, however, be embodied in many different forms and should not be construed as limited to the embodiments set forth herein; rather, these embodiments are provided by way of illustration only and so that this disclosure will be thorough, complete, and will fully convey the full scope of the inventive concepts to those skilled in the art. Representative systems and corresponding methods will be disclosed.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 7A is a perspective view of a dynamic wedge assembly;

FIG. 7B is a cutaway side view of a dynamic wedge assembly;

FIG. 7C is a top view of a dynamic wedge assembly;

FIG. 7D is a perspective view of a fixed wedge assembly;

FIG. 7E is a top view of a fixed wedge assembly;

DETAILED DESCRIPTION

Following are more detailed descriptions of various related concepts related to, and embodiments of, methods and apparatus according to the present invention. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
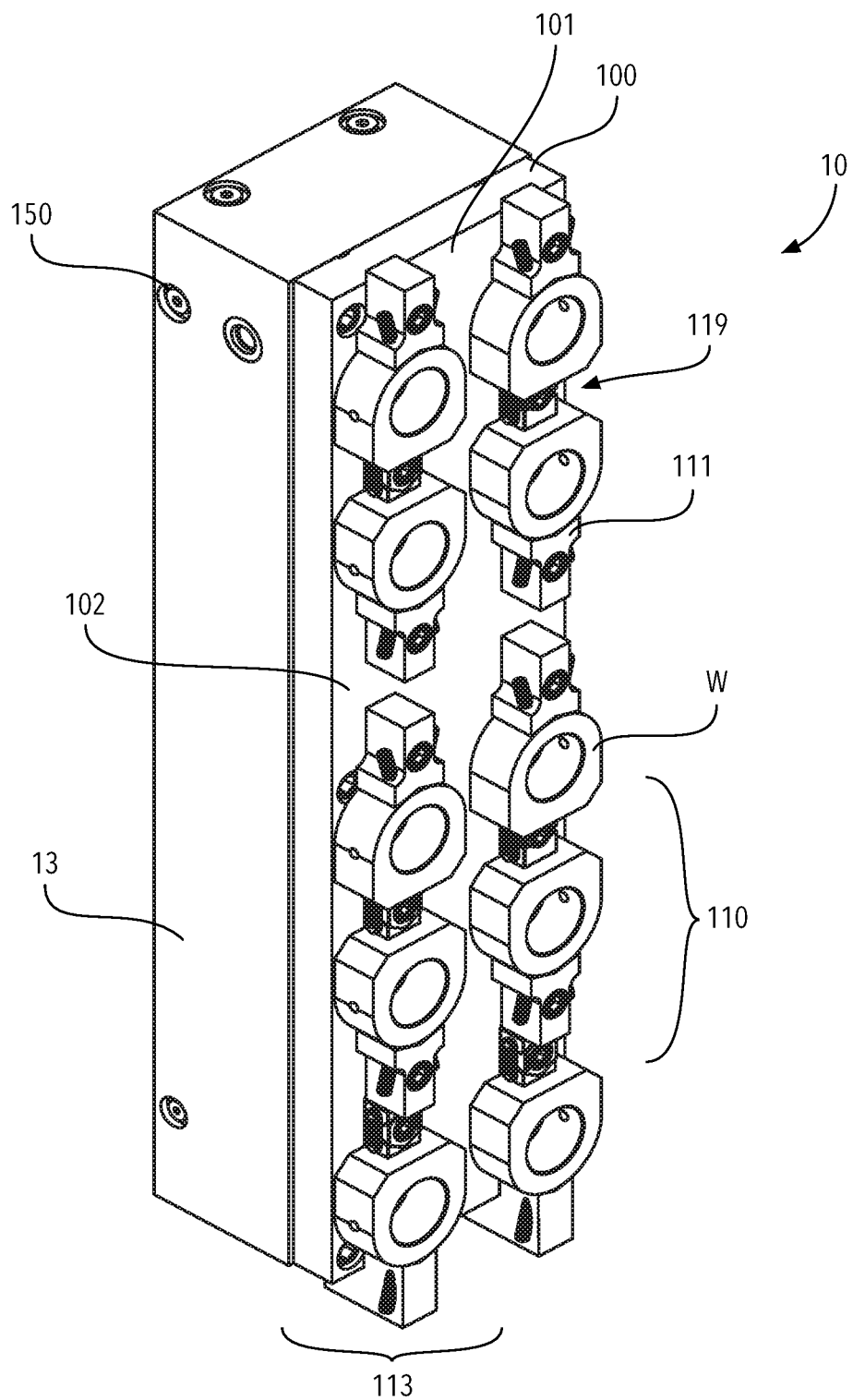
FIG. 1 is a perspective view of a representative modular workpiece holding system including workpieces.
Figure 2:
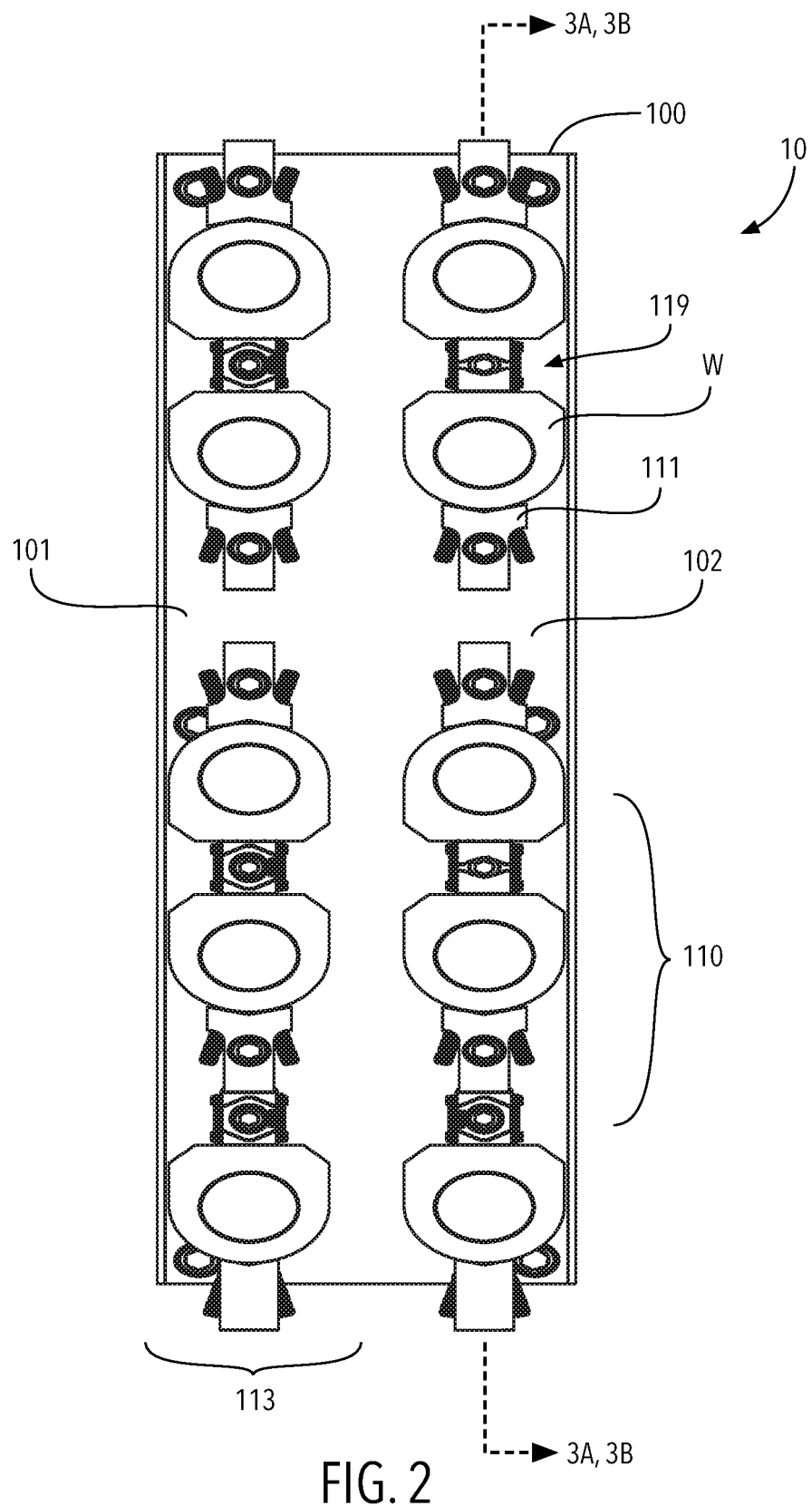
FIG. 2 is a top view of the modular workpiece holding system shown in FIG. 1.
Figure 3:
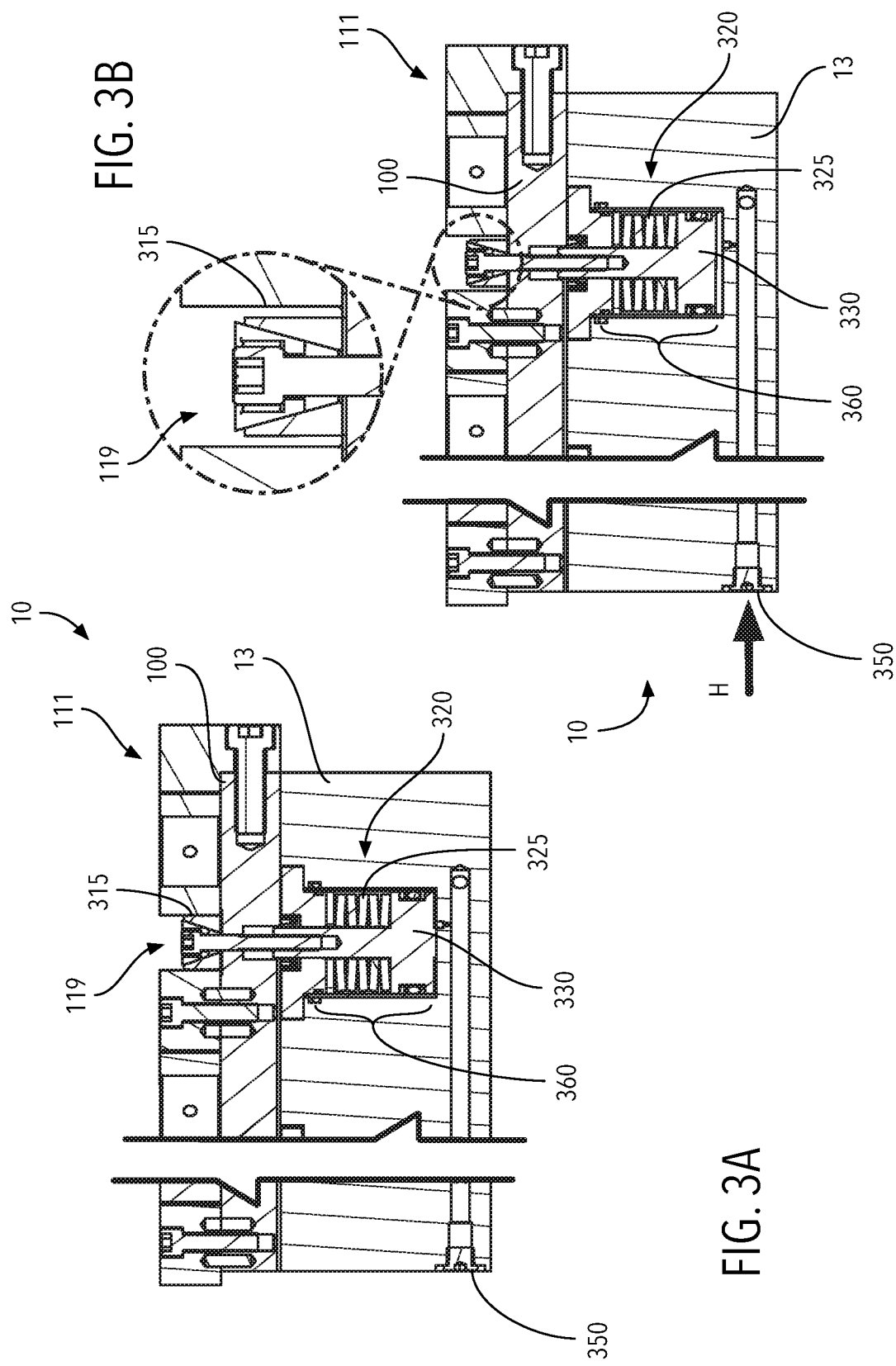
FIG. 3A is a cross-sectional view of the modular workpiece holding system in a resting state, taken generally along line 3A-3A in FIG. 2.
FIG. 3B is a cross-sectional view of the modular workpiece holding system in an active state, taken generally along line 3B-3B in FIG. 2.
Figure 4:
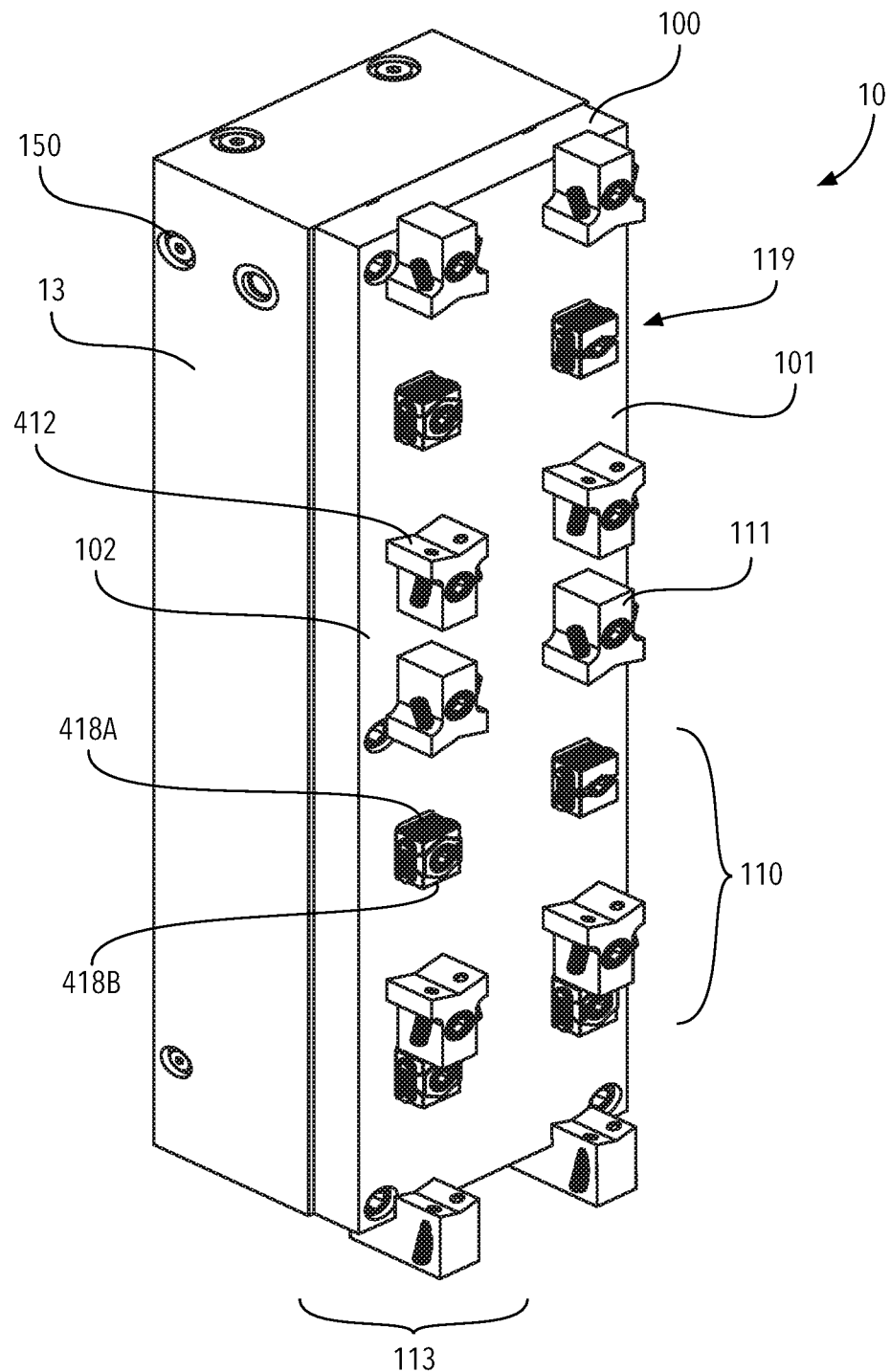
FIG. 4 is a perspective view of the modular workpiece holding system shown without workpieces.

FIGS. 1-8 illustrate a representative modular workpiece holding system 10 that has a top portion 101 of baseplate member 100 disposed on fixture base 13 and arranged to have at least one wedge pair 110, each wedge pair 110 having an opposingly facing fixed wedge assembly 111 and dynamic wedge assembly 119. Dynamic wedge assembly 119, as illustrated in FIGS. 3 and 5A-5B, has an interior wedge 315 that forms at least one acute angle U from a vertical plane Z, the Z plane substantially orthogonal to a corresponding X and Y plane formed by planar surface 102 of baseplate member 100. The interior wedge of dynamic wedge assembly 315 of the representative embodiment creates acute angle U of less than ninety degrees relative to substantially planar surface 102 of baseplate member 100. Interior wedge 315 is designed to press dynamic wedge assembly face 418 transversely toward opposing fixed wedge assembly 111 when, as illustrated in FIG. 5A, the dynamic wedge assembly is drawn axially toward baseplate member 100, as illustrated in FIG. 3A, by spring member 325. Dynamic wedge assembly may have first wedge face 418A and second wedge face 418B.

Dynamic wedge assembly 119 is operationally coupled to spring member 325 via at least one spring and piston assembly 320 within fixture base 13 of modular workpiece holding system 10. At least one spring member 325 of spring and piston assembly 320 is designed to draw dynamic wedge assembly 119 axially towards baseplate member 100 wherein dynamic wedge assembly 119, when workpiece holding system 10 is, as illustrated in FIG. 3A, in a resting state, imparting, as further illustrated in FIG. 5A, transverse force T onto a workpiece member W, pressing the workpiece member W against the fixed wedge assembly 111, securing the workpiece member W to modular workpiece holding system 10. The spring force generated by the spring member 325 creates two force vectors imparted by the associated dynamic wedge assembly 119: 1) an inward or axial force vector denoted by A toward baseplate member 100 and, 2) a lateral or traverse force vector denoted by T toward opposing wedge member faces, the force represented by the force vectors imparted on workpiece member W and used to hold workpiece member W in place. In some embodiments, stops, not shown, may further restrain dynamic wedge assembly 119. Stops can limit transverse force T imparted onto a given workpiece W. In some embodiments, the force generated by spring member 325 may be adjustable by compressing or extending spring member 325 relative to baseplate member 100.

By securing workpiece member W when in the resting state, an active state is unneeded for securing workpiece member W and, therefore, an active state that could fail when working on workpiece member W is absent. Spring member 325 contained within spring and piston assembly 320 is disposed within spring and piston assembly cavity 360 of a fixture base 13. Spring and piston assembly 320 is designed to release dynamic wedge assembly 119 and workpiece member W when modular workpiece holding system 10 is in an active state, as illustrated in FIGS. 3B and 5B. This means workpiece members W require the active state to be released and will stay secure if there is a failure to render the modular workpiece holding system 10 in an active state.

FIGS. 3A and 3B illustrate that the active state is rendered by at least one or more of gas and hydraulic fluid H delivered by way of at least one port 150 within fixture base 13, the at least one or more of gas and hydraulic fluid H designed to at least partly fill spring and piston assembly cavity 360, pushing by way of piston 330 of spring and piston assembly 320, therefore, dynamic wedge assembly 119 axially outward from baseplate 100. The at least one or more of gas and hydraulic fluid H, when at least partially discharged from spring and piston assembly cavity 360 by way of at least one port 150 within fixture base 13, is designed to reduce outward axial force O imparted on dynamic wedge assembly 119, as illustrated in FIG. 5B, whereupon spring member 325 is designed to re-impart traverse force T of the resting state of dynamic wedge assembly 119 onto at least one or more of the same and a different workpiece member W. In some embodiments, ports 150 may be exclusively for inflow and outflow and may be of different sizes.

In some embodiments of modular workpiece holding system 10, at least one wedge pair 110 is disposed within at least one wedge pair row 130. In some embodiments of modular workpiece holding system 10, each wedge pair 110 of each row opens simultaneously with each other wedge pair 110 in that wedge pair row 130. In the representative embodiment, modular workpiece holding system 10 has two rows of wedge pairs 110. In alternative embodiments, wedge pairs 110 with opposing faces may both be dynamic wedge pairs 119.

Figure 6:
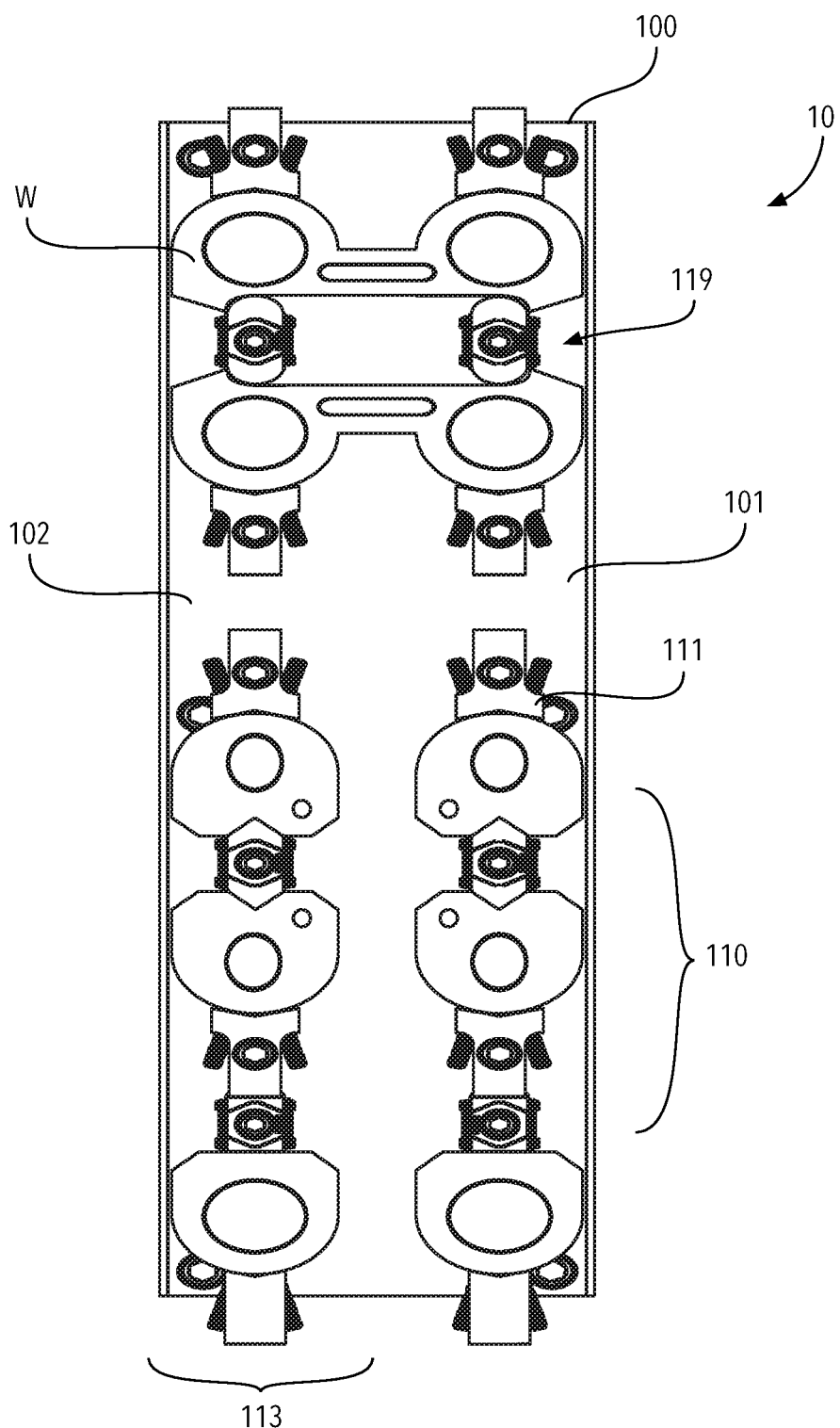
FIG. 6 is a top view of the modular workpiece holding system shown in FIG. 1 with exchangeable dynamic wedge assemblies.

As illustrated in FIG. 6, in some embodiments of modular workpiece holding system 10, the shape of dynamic wedge assembly 119 is adjustable. Such adjustments can optimize the ability of workpiece holding system 10 to hold a given workpiece member W. In these embodiments of modular workpiece holding system 10, the shape of dynamic wedge assembly face 418 relative to its opposing fixed wedge assembly 111 is adjusted by exchanging at least one or more of dynamic wedge assembly 119. Fixed wedge assembly 111 in some embodiments may be exchanged, therefore allowing for more than one type of fixed wedge assembly face 412.

FIGS. 7A-7B present views of fixed wedge assembly 111 and dynamic wedge assembly 119 to illustrate fixed wedge assembly face 412 and dynamic wedge assembly face 419.

Figure 5A:
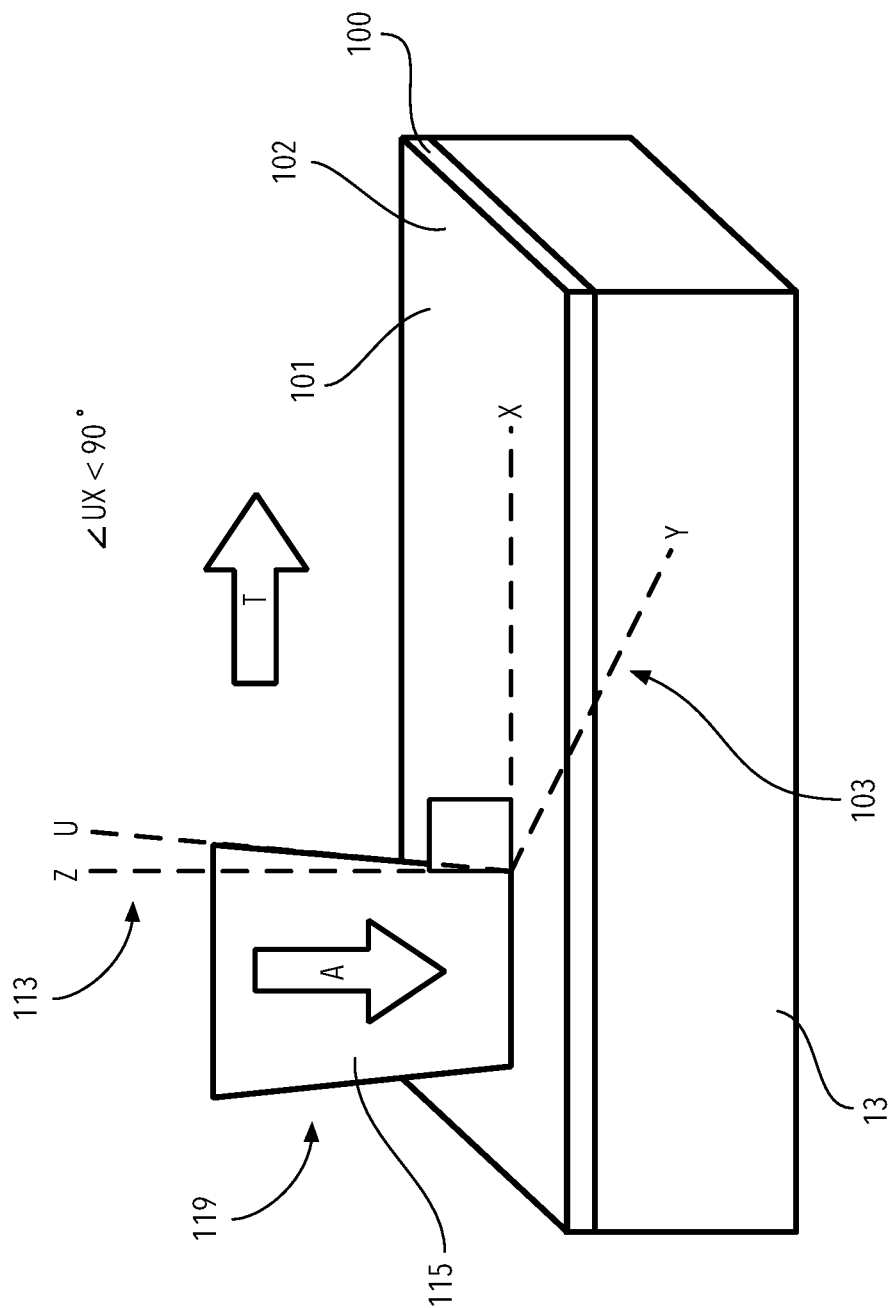
FIG. 5A illustrates axial inward forces and traverse forces generated by dynamic wedge assemblies.
Figure 5B:
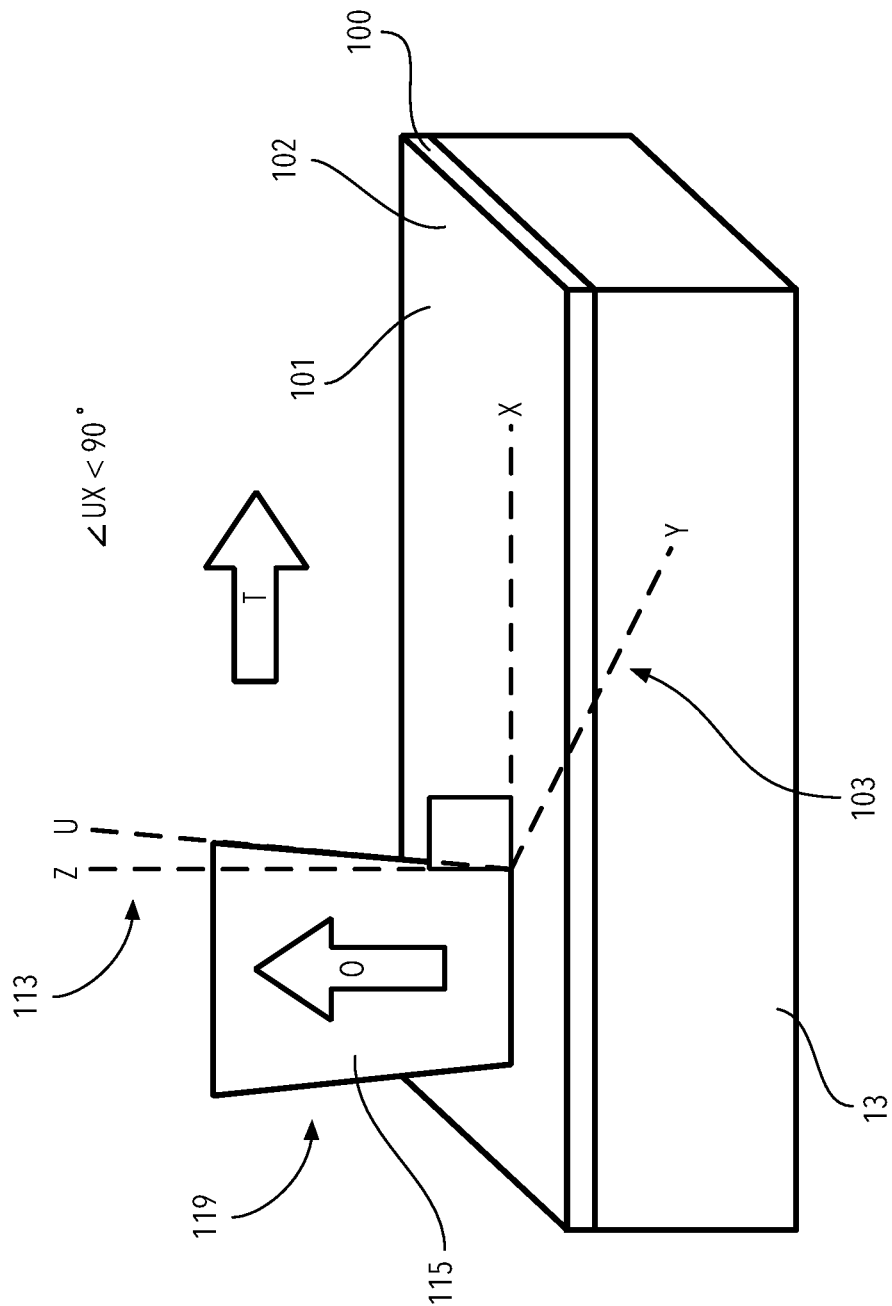
FIG. 5B illustrates axial outward forces and reduced traverse forces generated by dynamic wedge assemblies.
Figure 8:
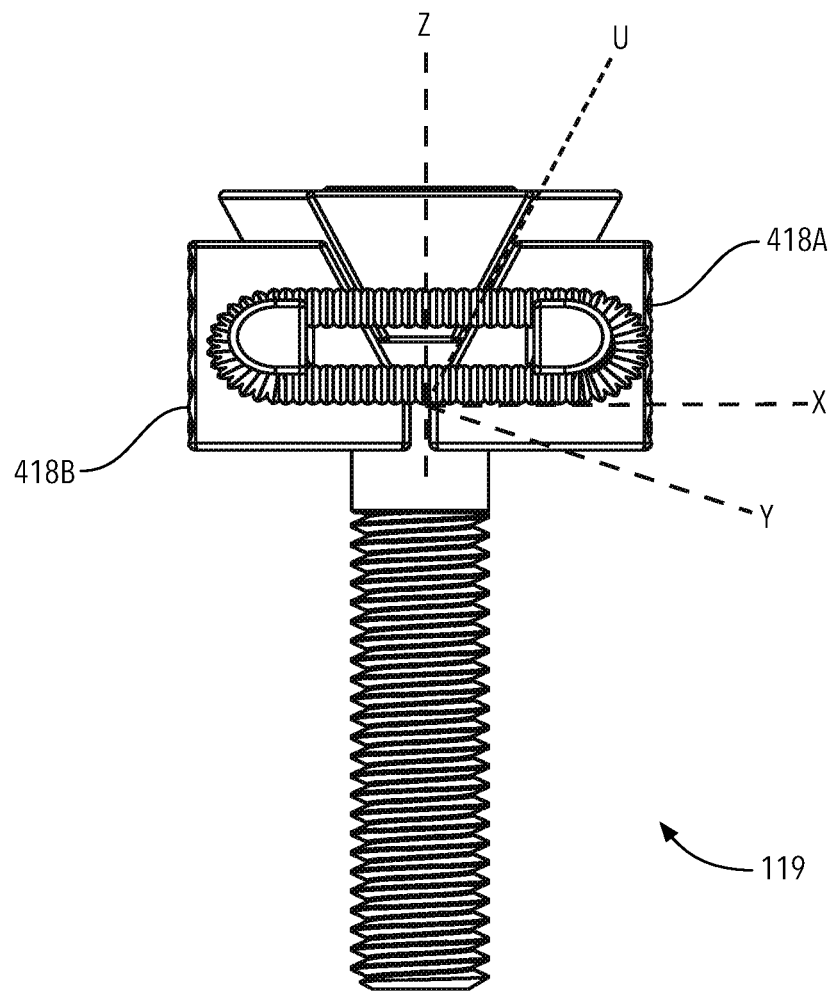
FIG. 8 illustrates a linear alignment of a dynamic wedge assembly for generating forces as presented in FIGS. 5A and 5B; and, FIG. 9 is a representative method for using the modular workpiece holding system.

FIG. 8 illustrates dynamic wedge assembly 119 using angles and plans illustrated in FIGS. 5A-5B and dynamic wedge assembly 119 illustrated in FIG. 7B wherein interior wedge 315 forms at least one acute angle U from vertical plane Z, the Z plane substantially orthogonal to a corresponding X and Y plane formed by planar surface 102 of baseplate member 100.

As further illustrated in FIGS. 1-8, in some embodiments, dynamic wedge assembly 119 may have at least one or more pivotable coupling assemblies, sometimes referred to as a hinge, not shown, which may allow at least one helically threaded member to be used to change the angle, the helically threaded member robust enough to handle expected force generated from given spring member 325 on associated dynamic wedge assembly 119.

In some embodiments of modular workpiece holding system 10, the release of the at least one or more of a gas and hydraulic fluid H is partial, thereby reducing axial force A and, therefore, transverse force T of spring member 325 imparted on workpiece member W relative to the resting state. In some embodiments of modular workpiece holding system 10, wedge members 111, 119 are substantially at least one or more of iron and steel. Other metals may be used along with polymers and ceramics. In some embodiments of modular workpiece holding system 10, at least the opposing of at least one or more of dynamic wedge assembly face 418 and fixed wedge assembly face 412 are substantially a polymer. A polymer covering wedge member faces 412, 418 can protect workpiece members W that may otherwise be damaged by metal-to-metal contact with metal wedge faces. In some embodiments of modular workpiece holding system 10, at least a portion of baseplate member 100 is interchangeable.

Some embodiments of modular workpiece holding system 10 have top portion 101 of baseplate member 100 arranged to have at least one wedge pair 110 arranged to have two or more parallel rows of at least one wedge pair 110 in each row. Each wedge pair 110 has opposingly facing fixed wedge assembly 111 and dynamic wedge assembly 119. At least one fixed dynamic wedge assembly 119 is substantially bilaterally symmetrical and has outwardly facing first wedge face 418A and oppositely and outwardly facing second wedge face 418B, wedge faces 418A and 418B designed to each abut a different workpiece member W.

Each dynamic wedge assembly 119 is operationally coupled to at least one spring and piston assembly 320, spring member 325 designed to draw associated dynamic wedge assembly 119 axially towards baseplate member 100 wherein dynamic wedge assembly 119 imparts axial force A and transverse force T onto workpiece member W when modular workpiece holding system 10 is in the resting state, and presses workpiece member W against fixed wedge assembly 111, securing workpiece member W to modular workpiece holding system 10. Spring member 325 on these embodiments is contained within the spring assembly disposed within spring and piston assembly cavity 360 of fixture base 13. Spring and piston assembly 320 is designed to release dynamic wedge assembly 119 and workpiece member W when modular workpiece holding system 10 is in the active state. The active state is rendered by at least one or more of gas and hydraulic fluid H delivered by way of at least one port 150 within fixture base 13, the at least one or more of gas and hydraulic fluid H designed to at least partly fill spring and piston assembly cavity 360, pushing, therefore, dynamic wedge assembly 119 axially outward from baseplate 100. The at least one or more of gas and hydraulic fluid H, when discharged from spring and piston assembly cavity 360 by way of at least one port 150 within fixture base 13, is designed to reduce outward axial force O imparted on dynamic wedge assembly 119 whereupon the spring member is designed to re-impart inward axial force A and, therefore, traverse force T of the resting state of dynamic wedge assembly 119 onto at least one or more of the same and the different workpiece member W.

In some embodiments of modular workpiece holding system 10, wedge pair rows 130 open simultaneously. In some embodiments of modular workpiece holding system 10, baseplate member 100 may have protrusions or indentations 103 designed to form-fit given workpieces W.

Figure 9:
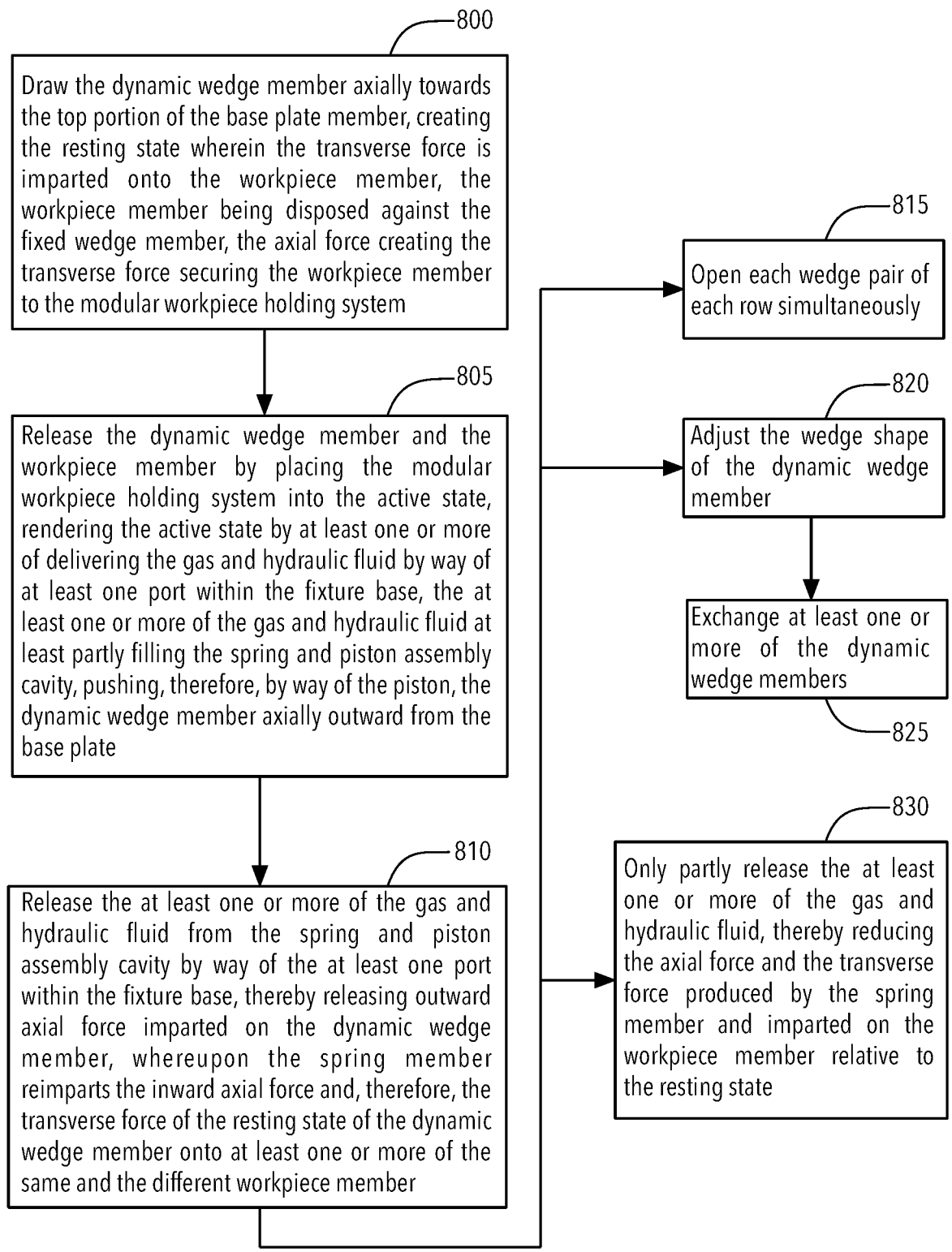

FIG. 9 illustrates a representative modular workpiece holding method including step 900, drawing dynamic wedge assembly 119 axially towards top portion 101 of baseplate member 100, creating a resting state wherein transverse force T is imparted onto workpiece member W, workpiece member W being disposed against fixed wedge assembly 111, axial force A creating transverse force T securing workpiece member W to modular workpiece holding system 10. The method includes step 905, releasing dynamic wedge assembly 119 and workpiece member W by placing modular workpiece holding system 10 into an active state, rendering the active state by at least one or more of delivering gas and hydraulic fluid H by way of at least one port 150 within the fixture base, at least one or more of the gas and hydraulic fluid H at least partly filling spring and piston assembly cavity 360, pushing, therefore, by way of piston 330, dynamic wedge assembly 119 axially outward from baseplate 100. The method includes step 910, discharging at least one or more of the gas and hydraulic fluid H from spring and piston assembly cavity 360 by way of at least one port 150 within the fixture base, thereby releasing outward axial force O imparted on dynamic wedge assembly 119, whereupon spring member 325 re-imparts inward axial force A and, therefore, traverse force T of the resting state of dynamic wedge assembly 119 onto at least one or more of the same and a different workpiece member W.

FIG. 9 further illustrates that the representative modular workpiece holding method may include step 915, opening each wedge pair 110 of each row simultaneously. The method may further include step 920, adjusting the wedge shape of dynamic wedge assembly 119. The method may further include step 925, adjusting the wedge shape of dynamic wedge assembly 119 by exchanging at least one or more of dynamic wedge assembly 119. The method may further include step 930, only partly releasing at least one or more of the gas and hydraulic fluid H, thereby reducing axial force A and transverse force T produced by spring member 325 and imparted on workpiece member W relative to the resting state.

The following patents are incorporated by reference in their entireties: U.S.7,464,853; U.S.6,170,836; U.S.5,961,261; CN211029092; CN209664890; CN209349869; CN107717501; DE102017113751; DE10117485; DE3531507; DE1097786; EP1702712;

While inventive concepts have been described above in terms of specific embodiments, it is to be understood that the inventive concepts are not limited to these disclosed embodiments. Upon reading the teachings of this disclosure, many modifications and other embodiments of the inventive concepts will come to mind of those skilled in the art to which these inventive concepts pertain, and which are intended to be and are covered by both this disclosure and the appended claims. It is indeed intended that the scope of the inventive concepts should be determined by proper interpretation and construction of the appended claims and their legal equivalents, as understood by those of skill in the art relying upon the disclosure in this specification and the attached drawings.

REFERENCE NUMERALS

10 Modular workpiece holding system
13 Fixture base
100 Baseplate member
101 Top portion of the baseplate member 102 Planar surface of the top portion of the baseplate member
110 Wedge pair
111 Fixed wedge assembly
119 Dynamic wedge assembly
130 Wedge pair rows
150 Port
315 Interior wedge
320 Spring and piston assembly
325 Spring member
360 Spring and piston assembly cavity
412 Fixed wedge face
418 Dynamic wedge face
    418A First dynamic wedge face
    418B Second dynamic wedge face
900-930 Modular workpiece holding method
A Inward axial force
H Gas and hydraulic fluid
Outward axial force
T Traverse force
W Workpiece member

What is claimed is:

1. A modular workpiece holding system comprising:
a top portion of a baseplate member disposed on a fixture base and arranged to have at least one wedge pair, each of the wedge pair having an opposingly facing fixed wedge assembly and dynamic wedge assembly;
each of the dynamic wedge assembly operationally coupled to at least one spring and piston assembly, each of the spring and piston assembly having at least one spring member, each of the spring and piston assembly disposed within a respective spring and piston assembly cavity of the fixture base;
each of the at least one spring member of each of the spring and piston assembly adapted to draw each of the dynamic wedge assembly axially towards the baseplate member wherein each of the dynamic wedge assembly, when the workpiece holding system is in a resting state, imparts a transverse force onto a workpiece member, pressing the workpiece member against each of the fixed wedge assembly, securing the workpiece to the workpiece holding system;
each of the spring and piston assembly adapted to release each of the dynamic wedge assembly and the workpiece member when the workpiece holding system is in an active state, the active state rendered by at least one of a gas and/or hydraulic fluid delivered by way of at least one port within the fixture base, the at least one of a gas and/or hydraulic fluid adapted to at least partly fill each of the respective spring and piston assembly cavity, pushing, therefore, by way of a piston member of each of the spring and piston assembly, each of the dynamic wedge assembly axially outward from the baseplate; the at least one of a gas and/or hydraulic fluid, when discharged from each of the respective spring and piston assembly cavity by way of the at least one port within the fixture base, adapted to reduce outward axial force imparted on each of the dynamic wedge assembly, whereupon each of the spring member is adapted to re-impart an inward axial force and, therefore, the traverse force of the resting state of each of the dynamic wedge assembly onto at least one or more of the same workpiece and a different workpiece; wherein a shape of each of the dynamic wedge assembly is adjustable.

2. The modular workpiece holding system of claim 1 wherein each of the at least one wedge pair is disposed within at least one wedge pair row.

3. The modular workpiece holding system of claim 1 wherein each of the wedge pair of a row opens simultaneously with each of an other wedge pair in the wedge pair row.

4. The modular workpiece holding system of claim 1 wherein the shape of each of the dynamic wedge assembly is adjusted by exchanging at least one or more of the dynamic wedge assembly assemblies.

5. The modular workpiece holding system of claim 1 wherein the release of the at least one of a gas and/or hydraulic fluid is partial, thereby reducing the outward axial force and the transverse force of the spring member imparted on the workpiece relative to the resting state.

6. The modular workpiece holding system of claim 1 wherein each of the wedge members are substantially at least one or more of iron and steel.

7. The modular workpiece holding system of claim 1 wherein at least the opposing wedge surfaces of the at least one of the dynamic wedge assembly and the fixed wedge assembly are substantially a polymer.

8. The modular workpiece holding system of claim 1 wherein at least a portion of the baseplate member is interchangeable.

9. A modular workpiece holding method comprising:
drawing at least one dynamic wedge assembly axially inward towards a top portion of a baseplate member, creating a resting state wherein a transverse force is imparted onto a workpiece member, the workpiece member disposed against the baseplate member and a fixed wedge assembly, the transverse force securing the workpiece to the workpiece holding system;
releasing the at least one dynamic wedge assembly and the workpiece member by placing the workpiece holding system into an active state, rendering the active state by at least one of delivering a gas and/or hydraulic fluid by way of at least one port within a fixture base, the at least one of a gas and/or hydraulic fluid at least partly filling a spring and piston assembly cavity, pushing, therefore, by way of a piston member of a spring and piston assembly, the at least one dynamic wedge assembly axially outward from the baseplate; and, discharging the at least one of a gas and/or hydraulic fluid from the spring and piston assembly cavity by way of the at least one port within the fixture base, thereby releasing outward axial force imparted on the at least one dynamic wedge assembly whereupon the spring member re-imparts an inward axial force and, therefore, the traverse force of the resting state of the at least one dynamic wedge assembly onto at least one of the same workpiece and a different workpiece;
and adjusting the wedge shape of the at least one dynamic wedge assembly.

10. The modular workpiece holding method of claim 9, the method further including opening two or more wedge pairs simultaneously.

11. The modular workpiece holding method of claim 9, the method further including adjusting the wedge shape of the at least one dynamic wedge assembly by exchanging at least one of the dynamic wedge assembly.

12. The modular workpiece holding method of claim 9, the method further including only partially discharging the at least one of a gas and/or hydraulic fluid, thereby reducing the outward axial force and the transverse force of the spring member imparted on the workpiece relative to the resting state.

13. The modular workpiece holding method of claim 9, the method further including interchanging at least a portion of the baseplate member.

14. A modular workpiece holding system comprising:
a top portion of a baseplate member disposed on a fixture base and arranged to have a least one wedge pair, each of wedge pairs of the at least one wedge pair arranged to have two or more parallel rows of the at least one wedge pair in each row, each of the wedge pair having an opposingly facing fixed wedge assembly and dynamic wedge assembly;
at least one fixed dynamic wedge assembly that is substantially bilaterally symmetrical with an outwardly facing first wedge face and an oppositely and outwardly facing second wedge face, the wedge faces adapted to each abut a different workpiece member;
each of the dynamic wedge assembly operationally coupled to at least one spring and piston assembly, at least one spring member of each of the spring and piston assembly adapted to draw each of the dynamic wedge assembly axially towards the baseplate member wherein each of the dynamic wedge assembly, when the workpiece holding system is in a resting state, imparts a transverse force onto each of the workpiece member, pressing each of the workpiece member against each of the fixed wedge assembly, securing each of the workpiece to the workpiece holding system;
each of the spring and piston assembly adapted to release each of the dynamic wedge assembly and each of the workpiece member when the workpiece holding system is in an active state, the active state rendered by at least one of a gas and/or hydraulic fluid delivered by way of at least one port within the fixture base, the at least one of a gas and/or hydraulic fluid adapted to at least partly fill a respective spring and piston assembly cavity, pushing, therefore, by way of a piston member of each of the spring and piston assembly, each of the dynamic wedge assembly axially outward from the baseplate; and
the at least one of a gas and/or hydraulic fluid, when discharged from each of the respective spring and piston assembly cavity by way of the at least one port within the fixture base, adapted to reduce outward axial force imparted on each of the dynamic wedge assembly whereupon each of the spring member is adapted to re-impart an inward axial force and, therefore, the traverse force of the resting state of each of the dynamic wedge assembly onto at least one of the same workpiece and a different workpiece; wherein a shape of each of the dynamic wedge assembly is adjustable.

15. The modular workpiece holding system of claim 14 wherein each of the wedge pair of each row can is configured to be released simultaneously.

16. The modular workpiece holding system of claim 14 wherein at least the opposing wedge surfaces of the at least one or mom of each of the dynamic wedge assembly and each of the fixed wedge assembly are substantially a polymer.

17. The modular workpiece holding system of claim 14, wherein the release of the at least one of a gas and/or hydraulic fluid is partial, thereby reducing the outward axial force and the transverse force of each of the spring member imparted on each of the workpiece relative to the resting state.

18. The modular workpiece holding system of claim 14 wherein at least a portion of the baseplate member is interchangeable.

* * * * *